US007684572B2

(12) United States Patent
Ito

(10) Patent No.: US 7,684,572 B2
(45) Date of Patent: Mar. 23, 2010

(54) MIXER APPARATUS AND MUSIC APPARATUS CAPABLE OF COMMUNICATING WITH THE MIXER APPARATUS

(75) Inventor: Mikio Ito, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1873 days.

(21) Appl. No.: 10/306,561

(22) Filed: Nov. 27, 2002

(65) Prior Publication Data

US 2003/0121401 A1 Jul. 3, 2003

(30) Foreign Application Priority Data

Dec. 12, 2001 (JP) ............................ 2001-378872

(51) Int. Cl.
*H04B 1/00* (2006.01)
*H04B 17/02* (2006.01)
*G06F 17/00* (2006.01)
*H04B 1/20* (2006.01)
*G10H 1/08* (2006.01)

(52) U.S. Cl. ...................... 381/119; 455/137; 455/138; 455/139; 700/94; 369/4; 84/625; 84/660

(58) Field of Classification Search ................. 381/119; 369/4; 84/625, 609, 610, 660; 455/66, 137-139, 455/41.3, 41.2, 3.06, 66.1; 700/94
See application file for complete search history.

(56) References Cited

U.S. PATENT DOCUMENTS

| | | | | |
|---|---|---|---|---|
| 5,402,501 | A * | 3/1995 | Silfvajt et al. | 381/119 |
| 5,697,092 | A * | 12/1997 | Mourant et al. | 455/323 |
| 5,732,326 | A * | 3/1998 | Maruyama et al. | 455/66.1 |
| 5,966,639 | A | 10/1999 | Goldberg | |
| 6,007,228 | A * | 12/1999 | Agarwal et al. | 700/94 |
| 6,148,175 | A * | 11/2000 | Freedland | 455/3.06 |
| 6,339,706 | B1 | 1/2002 | Tillgren et al. | |
| 6,349,283 | B1 * | 2/2002 | Sanders | 704/278 |
| 6,748,195 | B1 * | 6/2004 | Phillips | 455/41.2 |
| 6,839,441 | B1 * | 1/2005 | Powers et al. | 381/119 |
| 6,871,046 | B2 * | 3/2005 | Kitagawa et al. | 455/17 |
| 6,871,048 | B2 * | 3/2005 | Takagaki | 455/66.1 |
| 2002/0015504 | A1 * | 2/2002 | Kohno et al. | 381/119 |

FOREIGN PATENT DOCUMENTS

EP 1107475 6/2001

* cited by examiner

*Primary Examiner*—Devona E Faulk
(74) *Attorney, Agent, or Firm*—Morrison & Foerster LLP

(57) ABSTRACT

A plurality of music apparatus 10 to 30 such as an electronic musical instrument and a microphone apparatus are connected by wireless to a mixer apparatus 40. A Bluetooth module is adopted as wireless communication means to construct a piconet with mixer apparatus 40 functioning as a master and music apparatus 10 to 30 functioning as slaves. Audio signals and MIDI data from music apparatus 10 to 30 are transmitted by wireless to mixer apparatus 40 through isosynchronous communication procedure using Bluetooth modules 11, 21, 31, 41. In mixer apparatus 40, with regard to the MIDI data, music tone signals based on the MIDI data are produced, whereafter the produced music tone signals and the aforesaid audio signals transmitted by wireless are mixed. Wiring by means of cables between a plurality of music apparatus and a mixer apparatus is abolished, thereby eliminating the cumbersomeness of wiring and the restrictions accompanying the wiring.

8 Claims, 5 Drawing Sheets

MIXER APPARATUS AND MUSIC APPARATUS CAPABLE OF COMMUNICATING WITH THE MIXER APPARATUS

BACKGROUND OF THE INVENTION

1. Field of the Invention

The present invention relates to a mixer apparatus for inputting audio signals or audio signal producing signals respectively produced in a plurality of music apparatus and for mixing the input audio signals or audio signals produced on the basis of the input audio signal producing signals, as well as a music apparatus capable of wireless communication with the mixer apparatus.

2. Description of the Background Art

Hitherto, mixer apparatus for mixing audio signals from a plurality of music apparatus such as an electronic musical instrument and a microphone apparatus for output are well known.

However, the aforementioned conventional mixer apparatus are connected to the plurality of music apparatus by means of cables, giving rise to problems such as cumbersome wiring and connection of the cables and the restrictions imposed by the cables on the placement of the music apparatus and the mixer apparatus.

SUMMARY OF THE INVENTION

The present invention has been made in order to cope with the aforementioned problems of the prior art, and an object thereof is to provide a mixer apparatus for inputting audio signals or audio signal producing signals from a plurality of music apparatus by wireless without the use of cables and for mixing the input audio signals or audio signals produced on the basis of the input audio signal producing signals. Another object of the present invention is to provide a music apparatus capable of wireless communication with a mixer apparatus such as mentioned above and a computer readable program applied to the mixer apparatus.

In order to achieve the aforementioned objects, a characteristic feature of the present invention lies in a mixer apparatus for inputting audio signals or audio signal producing signals respectively produced in a plurality of music apparatus and for mixing the input audio signals or audio signals produced on the basis of the input audio signal producing signals, said mixer apparatus comprising a wireless communication section capable of wireless communication with the plurality of music apparatus by allowing the plurality of music apparatus to function as slaves and allowing the mixer apparatus itself to function as a master, said wireless communication section respectively receiving the audio signals or audio signal producing signals that are transmitted from the plurality of music apparatus; and a mixing section for mixing the audio signals received by the wireless communication section or the audio signals produced on the basis of the audio signal producing signals received by the wireless communication section.

In this case, the wireless communication section respectively issues requests to the plurality of music apparatus for transmittance of the audio signals or audio signal producing signals, and respectively receives the audio signals or audio signal producing signals that are transmitted from the plurality of music apparatus in response to the requests for transmittance Further, as means for wireless communication between the plurality of music apparatus and the mixer apparatus, one can use, for example, a wireless communication device according to the Bluetooth (registered trademark) standard. Further, when audio signal producing signals are transmitted from the music apparatus to the mixer apparatus, audio signals may be produced in an audio signal producing section comprised within the mixing section on the basis of the audio signal producing signals, and the produced audio signals may be mixed.

According to this feature, the audio signals or the audio signal producing signals from the plurality of music apparatus are supplied to the mixer apparatus by wireless, thereby eliminating the need for connecting the plurality of music apparatus to the mixer apparatus by means of cables. This saves the labor of wiring and connection of the cables, and the placement of the music apparatus and the mixer apparatus can be made freely without being restricted by the cables. Further, since the mixer apparatus inputs the audio signals or the audio signal producing signals from a plurality of music apparatus, traffic (transfer of information) can be controlled efficiently by allowing the mixer apparatus to function as a master and allowing the plurality of music apparatus to function as slaves.

Further, another characteristic feature of the present invention lies in that the wireless communication section receives the audio signals or audio signal producing signals from the plurality of music apparatus by isochronous communication procedure. In this case, isochronous communication (isochronous transfer) procedure makes use of an ACL link (asynchronous connection-less link). This feature allows that, if the number of music apparatus is small, the audio signals or the audio signal producing signals can be sent at a comparatively high transfer rate, so that the communication can be made with comparatively less delays.

Further, another characteristic feature of the present invention lies in that the mixer apparatus further comprises mixed signal transmitting section for transmitting the audio signals mixed in the mixing section to the plurality of music apparatus via the aforesaid wireless communication section. According to this feature, the results of mixing the plurality of audio signals are sent to each music apparatus by wireless, so that the aforesaid results of mixing can be monitored at the position of each music apparatus.

Further, another characteristic feature of the present invention lies in that the aforesaid wireless communication section transmits the audio signals mixed in the mixing section to the plurality of music apparatus by broadcast communication procedure (multiple address communication procedure). According to this feature, the results of mixing a plurality of audio signals are transmitted by broadcast communication, so that the traffic can be controlled efficiently without increasing the traffic amount.

Further, another characteristic feature of the present invention lies in that the mixer apparatus further comprises communication condition setting section for setting conditions of communication with the plurality of music apparatus in a state in which a wireless connection is established between the mixer apparatus and the plurality of music apparatus. In this case, the communication conditions are, for example, selection of the type of music apparatus from which the audio signals or audio signal producing signals are to be input into the mixer apparatus, selection of the type of signals (audio signals or audio signal producing signals) which are to be supplied from the music apparatus to the mixer apparatus, and selection of the music apparatus to which the results of mixing the plurality of audio signals are to be output. This feature allows that, even if the combination of a plurality of music apparatus supplied to the mixer apparatus is changed, one can meet the change speedily.

Further, another characteristic feature of the present invention lies in that the mixer apparatus comprises wired input section connected by wire to a different music apparatus other than the plurality of music apparatus, for wired input of audio signals or audio signal producing signals for producing audio signals that are output from the different music apparatus, wherein the aforesaid mixing section also mixes the audio signals input by the wired input section or the audio signals produced on the basis of the audio signal producing signals input by the wired input section, in addition to the audio signals received by the wireless communication section or the audio signals produced on the basis of the audio signal producing signals received by the wireless communication section.

This feature allows that, even if a music apparatus incapable of wireless communication with the mixer apparatus is present, the music apparatus can be connected by wire to the mixer apparatus, whereby audio signals from this music apparatus connected by wire or the audio signals produced on the basis of the audio signal producing signals from this music apparatus can be mixed as well by the mixer apparatus. As a result of this, this mixer apparatus can be applied to a variety of music apparatus.

Further, another characteristic feature of the present invention lies in that the mixer apparatus further comprises audio signal generating section for generating audio signal independently from the aforesaid plurality of music apparatus, wherein the aforesaid mixing section also mixes the audio signals generated by the audio signal generating section, in addition to the audio signals received by the wireless communication section or the audio signals produced on the basis of the audio signal producing signals received by the wireless communication section. According to this feature, more audio signals can be mixed, whereby a more opulent music can be realized.

Further, another characteristic feature of the present invention lies in a music apparatus capable of wireless communication with a mixer apparatus that mixes a plurality of audio signals, wherein the music apparatus comprises mixing signal generating section for generating the audio signals that will be subjected to mixing or audio signal producing signals for producing the audio signals that will be subjected to mixing; a wireless communication section for transmitting by wireless to the mixer apparatus the audio signals or the audio signal producing signals generated by the mixing signal generating section and for receiving mixed signals mixed by the mixer apparatus and transmitted by wireless from the mixer apparatus, said mixed signals including the audio signals transmitted by wireless from the music apparatus or the audio signals produced on the basis of the audio signal producing signals transmitted by wireless from the music apparatus; and reproduction section for reproducing the audio signals received by the wireless communication section.

In this case as well, as means for wireless communication between the music apparatus and the mixer apparatus, one can use, for example, a wireless communication device according to the Bluetooth standard. Further, when audio signal producing signals are transmitted from the music apparatus to the mixer apparatus, audio signals may be produced in an audio signal producing section comprised within the mixing section on the basis of the audio signal producing signals, and the produced audio signals may be mixed.

This feature as well eliminates the need for connecting the music apparatus to the mixer apparatus by means of cables, and saves the labor of wiring and connection of the cables. Also, the placement of the music apparatus and the mixer apparatus can be made freely without being restricted by the cables. Furthermore, since the music apparatus inputs and reproduces the results of mixing the plurality of audio signals in the mixer apparatus, the aforesaid results of mixing can be monitored at the position of the music apparatus.

Further, another characteristic feature of the present invention lies in a computer readable program that is applied to a mixing apparatus and music apparatus for allowing the mixing apparatus and music apparatus to perform the aforementioned functions. According to this feature, the aforementioned various functions can be implemented easily by the mixing apparatus and music apparatus having a wireless communication function.

DESCRIPTION OF THE PREFERRED EMBODIMENTS

Figure 1:
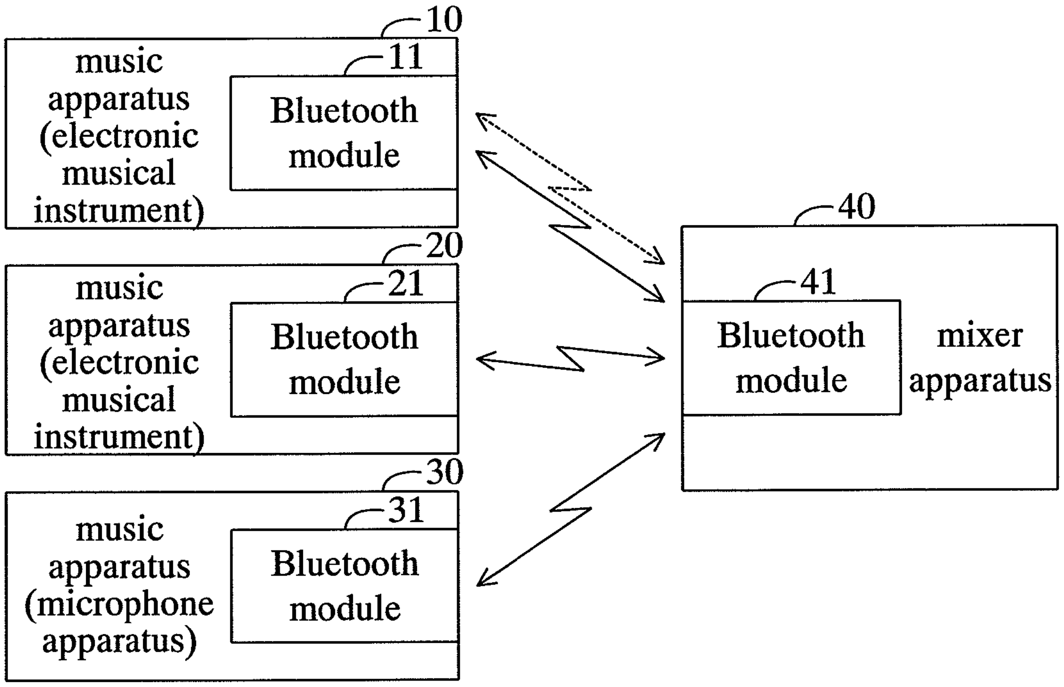
FIG. 1 is a block diagram illustrating a network according to one embodiment of the present invention.

Hereafter, one embodiment of the present invention will be described with reference to the attached drawings. FIG. 1 is a block diagram illustrating a network according to this embodiment.

This network is constituted with a plurality of music apparatus 10 to 30 and a mixer apparatus 40 respectively capable of wireless communication with these music apparatus 10 to 30. Music apparatus 10 to 30 produce audio signals such as music tone signals or produce audio signal producing signals (for example, MIDI data) such as key-on signals, key-off signals, tone color control signals, and tone volume control signals that are used for production of these audio signals. Mixer apparatus 40 inputs audio signals or audio signal producing signals from plural music apparatus 10 to 30, and mixes the audio signals or audio signals produced on the basis of the audio signal producing signals for output.

These music apparatus 10 to 30 and mixer apparatus 40 respectively include, as a wireless communication section, Bluetooth (registered trademark) modules 11, 21, 31, 41 that allows wireless communication with each other in accordance with the Bluetooth communication standard. The wireless communication according to the Bluetooth communication standard provides data exchange between plural apparatus with the use of a spectrum diffusion procedure of frequency hopping type. Further, in the wireless communication using this Bluetooth communication standard, a wireless network called "piconet" is constructed which is made of one master and one or more slaves, where Bluetooth modules belonging to one and the same piconet are in a synchronized state with each other in the frequency axis and in the time axis.

Further, in the Bluetooth communication standard, one of two types of communication links, which are an SCO (synchronous connection-oriented) link and an ACL (asynchronous connection-less) link, is selected for use in accordance with a setting. Furthermore, the communication in this ACL link is set to use one procedure selected from the asynchronous communication procedure, the isochronous communication (isochronous transfer) procedure, and the broadcast communication procedure (multiple address communication procedure).

Here, among the above-described characteristics of the Bluetooth communication standard, this embodiment is characterized by adopting a piconet construction including one master and plural slaves as well as the isochronous communication procedure and the broadcast communication procedure in the ACL link. Various wireless communication techniques conforming to a communication standard having the aforesaid characteristics can be applied to the present invention even if the techniques do not conform to the Bluetooth communication standard.

Figure 2:
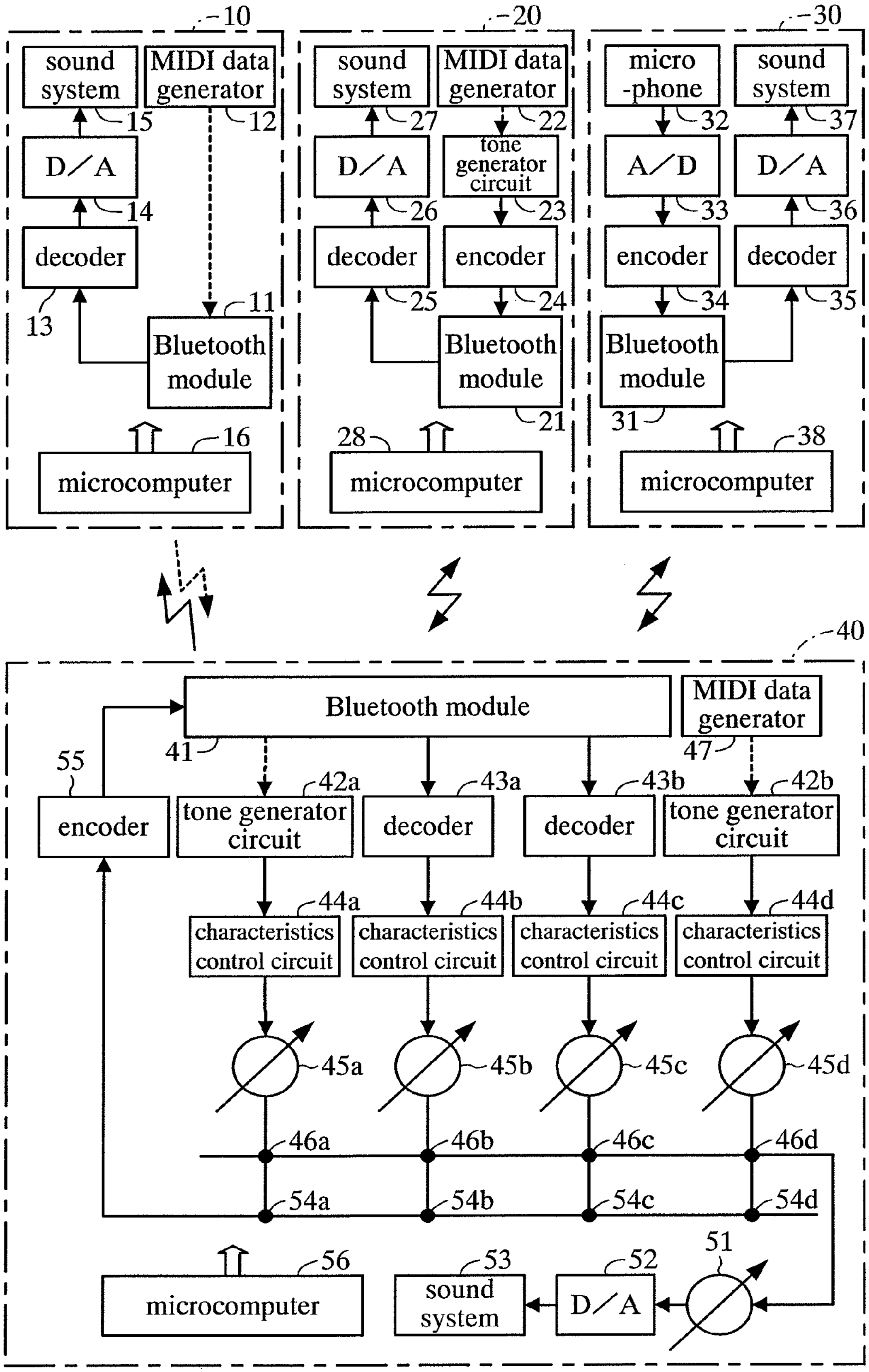
FIG. 2 is a functional block diagram illustrating the network of FIG. 1 in further detail.

The aforesaid network of FIG. 1 will be further detailed using the functional block diagram of FIG. 2 by raising specific examples of music apparatus 10 to 30. Here, the illustrated arrows drawn in solid lines denote audio signals and the illustrated arrows drawn in broken lines denote MIDI data.

Music apparatus 10 is constituted with an electronic musical instrument and produces MIDI data for output. This music apparatus 10 is provided with a MIDI data generator 12 that generates MIDI data, and the MIDI data generated by MIDI data generator 12 are transmitted by wireless to mixer apparatus 40 by Bluetooth module 11. On the other hand, the audio signals transmitted by wireless from mixer apparatus 40 are received by Bluetooth module 11 and supplied to sound system 15 via decoder 13 and D/A converter 14. Decoder 13 decodes (decompresses) the audio signals that are encoded (compressed) by mixer apparatus 40 and outputs the decoded audio signals. Further, music apparatus 10 includes a microcomputer 16, and microcomputer 16 performs various functions in music apparatus 10 by a program process.

Music apparatus 20 also is constituted with an electronic musical instrument and produces and outputs digital music tone signals (audio signals). This music apparatus 20 is provided with a MIDI data generator 22 that generates MIDI data and a tone generator circuit 23 that produces and outputs digital music tone signals (audio signals) on the basis of the aforesaid generated MIDI data. These digital music tone signals are encoded (compressed) by encoder 24 and transmitted by wireless to mixer apparatus 40 by Bluetooth module 21. On the other hand, the audio signals transmitted by wireless from mixer apparatus 40 are received by Bluetooth module 21 and supplied to sound system 27 via decoder 25 and D/A converter 26. Decoder 25 decodes (decompresses) and outputs the audio signals that are encoded (compressed) by mixer apparatus 40 as well. Further, in this case as well, music apparatus 20 includes a microcomputer 28, and microcomputer 28 performs various functions in music apparatus 20 by a program process.

Music apparatus 30 is constituted with a microphone apparatus and is provided with a microphone 32 that converts acoustic signals such as human voices and tones of musical instruments into audio signals by acoustic/electric conversion for output. These audio signals converted by microphone 32 are converted into digital audio signals by A/D converter 33. These converted digital audio signals are encoded (compressed) by encoder 34 and transmitted by wireless to mixer apparatus 40 by Bluetooth module 31. On the other hand, the audio signals transmitted by wireless from mixer apparatus 40 are received by Bluetooth module 31 and supplied to sound system 37 via decoder 35 and D/A converter 36. Decoder 35 decodes (decompresses) and outputs the audio signals that are encoded (compressed) by mixer apparatus 40 as well. Further, in this case as well, music apparatus 30 includes a microcomputer 38, and microcomputer 38 performs various functions in music apparatus 30 by a program process.

Mixer apparatus 40 is provided with a Bluetooth module 41 that receives the MIDI data, digital music tone signals, and digital audio signals respectively transmitted by wireless from music apparatus 10 to 30. These received MIDI data, digital music tone signals, and digital audio signals are respectively output to tone generator circuit 42*a*, decoder 43*a*, and decoder 43*b*, respectively. Tone generator circuit 42*a* produces and outputs digital music tone signals (one type of audio signals) on the basis of the MIDI data. Decoders 43*a*, 43*b* decode (decompress) and output the digital music tone signals and digital audio signals respectively encoded (compressed) by music apparatus 20, 30.

Characteristics control circuits 44*a* to 44*c* are respectively connected to tone generator circuit 42*a* and decoders 43*a*, 43*b*. Characteristics control circuits 44*a* to 44*c* respectively perform a compressing process, a limiting process, an equalizing process, and the like on the supplied digital music tone signals and digital audio signals for output. The compressing process is a process of changing the dynamic range of the input signals. The limiting process is a process of restraining the maximum level of the input signals. The equalizing process is a process of changing the frequency characteristics of the input signals.

Level setting circuits 45*a* to 45*c* are connected to respective outputs of characteristics control circuits 44*a* to 44*c*. Level setting circuits 45*a* to 45*c* change the input signal levels in various ways for output. The outputs of level setting circuits 45*a* to 45*c* are input into additive synthesis circuits 46*a* to 46*c*. Additive synthesis circuits 46*a* to 46*c* are each provided with a gate circuit that selectively outputs the signals from level setting circuits 45*a* to 45*c*, and the results of addition from the additive synthesis circuit of the previous stage (additive synthesis circuit located on the illustrated left side) are added to the signals selectively output from the aforesaid gate circuit and output to the additive synthesis circuit of the following stage (additive synthesis circuit located on the illustrated right side).

Further, mixer apparatus 40 is provided with a MIDI data generator 47 that outputs MIDI data independently with no relation to the outside music apparatus 10 to 30 and a tone generator circuit 42*b* that produces and outputs digital music tone signals (one type of audio signals) on the basis of the aforesaid generated MIDI data. The digital music tone signals output from tone generator circuit 42*b* are output to additive synthesis circuit 46*d* via characteristics control circuit 44*d* and level setting circuit 45*d* that are constructed in the same manner as the aforesaid characteristics control circuits 44*a* to 44*c* and level setting circuits 45*a* to 45*c*.

The output from additive synthesis circuit 46*d* of the final stage is input into level setting circuit 51. Level setting circuit 51 changes the input signal levels in various ways for output. The output of level setting circuit 51 is connected to sound system 53 via D/A converter 52 that converts digital signals to analog signals.

The respective outputs of level setting circuits 45*a* to 45*d* are also connected to additive synthesis circuits 54*a* to 54*d* that are constructed in the same manner as the aforesaid additive synthesis circuits 46*a* to 46*d*. Here, in additive synthesis circuits 54*a* to 54*d*, the additive synthesis circuit of the previous stage corresponds to the one located on the illustrated right side, and the additive synthesis circuit of the following stage corresponds to the one located on the illustrated left side. The output from additive synthesis circuit 54*a* of the final stage is encoded (compressed) by encoder 55 and respectively output to music apparatus 10 to 30 via Bluetooth module 41. Furthermore, mixer apparatus 40 includes a microcomputer 56, and microcomputer 56 performs various functions in mixer apparatus 40 by a program process.

Next, one embodiment of the electronic musical instruments used as the aforesaid music apparatus 10, 20 and a mixer apparatus of electronic musical instrument function incorporating type used as mixer apparatus 40 will be described with reference to FIG. 3.

The apparatus of this type is provided with a keyboard 61 made of a plurality of keys, a panel operator group 62 disposed on an operation panel, and a display 63. Each key indicates the generation of a music tone signal, and the pressing/depressing of each key is detected by a detection circuit 64 connected to bus 60. Panel switch group 62 is operated mainly in relation to the display on display 63, and selects or controls various functions in this apparatus, such as the music tone elements (pitch shift, tone color, tone volume, and the like) of the generated music tone signals, the effects imparted to the music tone signals, the state of mixing a plurality of music tone signals, the generation of automatic accompaniment tones, and the reproduction of automatic play tones. These operations of panel operator group 62 are detected by a detection circuit 65 connected to bus 60. Display 63 displays symbols, characters, and the like for selecting and setting various functions in this apparatus under control of a display circuit 66 connected to bus 60.

Also, a CPU 71, a timer 72, a ROM 73, a RAM 74, and an external storage device 75 are connected to bus 60. CPU 71 executes various programs including the programs shown in FIGS. 4 and 5 stored in ROM 73, RAM 74, or external storage device 75 in collaboration with timer 72 and RAM 74, thereby realizing various functions of this apparatus. External storage device 34 includes recording media having a comparatively large capacity such as a hard disk HD, a flexible disk FD, a compact disk CD, a magneto-optical disk MO, a digital versatile disk DVD, and a semiconductor memory, as well as a drive unit for each of the recording media. These recording media store various programs as well as various data used for implementing various functions of this apparatus, such as, various control data for producing music tone signals and for controlling the produced music tone signals, and control data for controlling the generation of music tone signals (automatic performance data made of MIDI data).

Also, a MIDI interface circuit 76 and a Bluetooth module 77 are connected to bus 60. MIDI interface circuit 76 inputs MIDI data from other music apparatus 78 such as electronic musical instruments and sequencers connected by wire, and outputs MIDI data to the aforesaid other music apparatus 78. Bluetooth module 77 receives audio signals and MIDI data from Bluetooth modules 79 incorporated in other music apparatus such as electronic musical instruments, sequencers, and microphone apparatus connected by wireless, and transmits audio signals and MIDI data to Bluetooth modules 79 incorporated in the aforesaid other music apparatus.

Also, a tone generator circuit 81 and a mixing circuit 82 are connected to bus 60. Tone generator circuit 81 produces music tone signals in accordance with the control signals (MIDI data) input via bus 60 and representing key-on, key-off, and others for output to mixing circuit 82. In this case, the aforesaid control signals (MIDI data) are supplied by performance operations on keyboard 61 and reproduction of music data stored in external storage device 75 by automatic play. Further, MIDI data supplied from other MIDI apparatus 78 to MIDI interface circuit 76 by wire and MIDI data supplied from other Bluetooth modules 79 to Bluetooth module 77 by wireless are supplied to tone generator circuit 81 via bus 60.

Mixing circuit 82 inputs digital music tone signals of plural series supplied from tone generator circuit 81 through channels that are different series by series, and mixes the plural music tone signals after controlling the characteristics and levels of the music tone signals for each channel. Also, an audio input circuit 83 connected by wire to other music apparatus 84 is connected to mixing circuit 82. Audio input circuit 83 inputs audio signals from other music apparatus (electronic musical instruments, automatic play apparatus, microphone apparatus, and the like) by wire and outputs the audio signals to mixing circuit 82. Also, audio signals transmitted by wireless from other Bluetooth modules 79 and received by Bluetooth module 77 are input into mixing circuit 82 via bus 60. Mixing circuit 82 respectively inputs the audio signals from audio input circuit 83 and Bluetooth module 77 as well through channels that are different from those of the aforesaid music tone signals, controls the characteristics and levels of the audio signals at each channel, and mixes the audio signals with the aforesaid digital music tone signals from tone generator circuit 81.

The output of mixing circuit 82 is connected to D/A converter 85. D/A converter 85 converts the digital audio signals from the mixing circuit into analog audio signals for output to sound system 86. Sound system 86 is composed of amplifiers 86*a*, 86*b*, speaker 86*c*, and headphone 86*d*.

Figure 3:
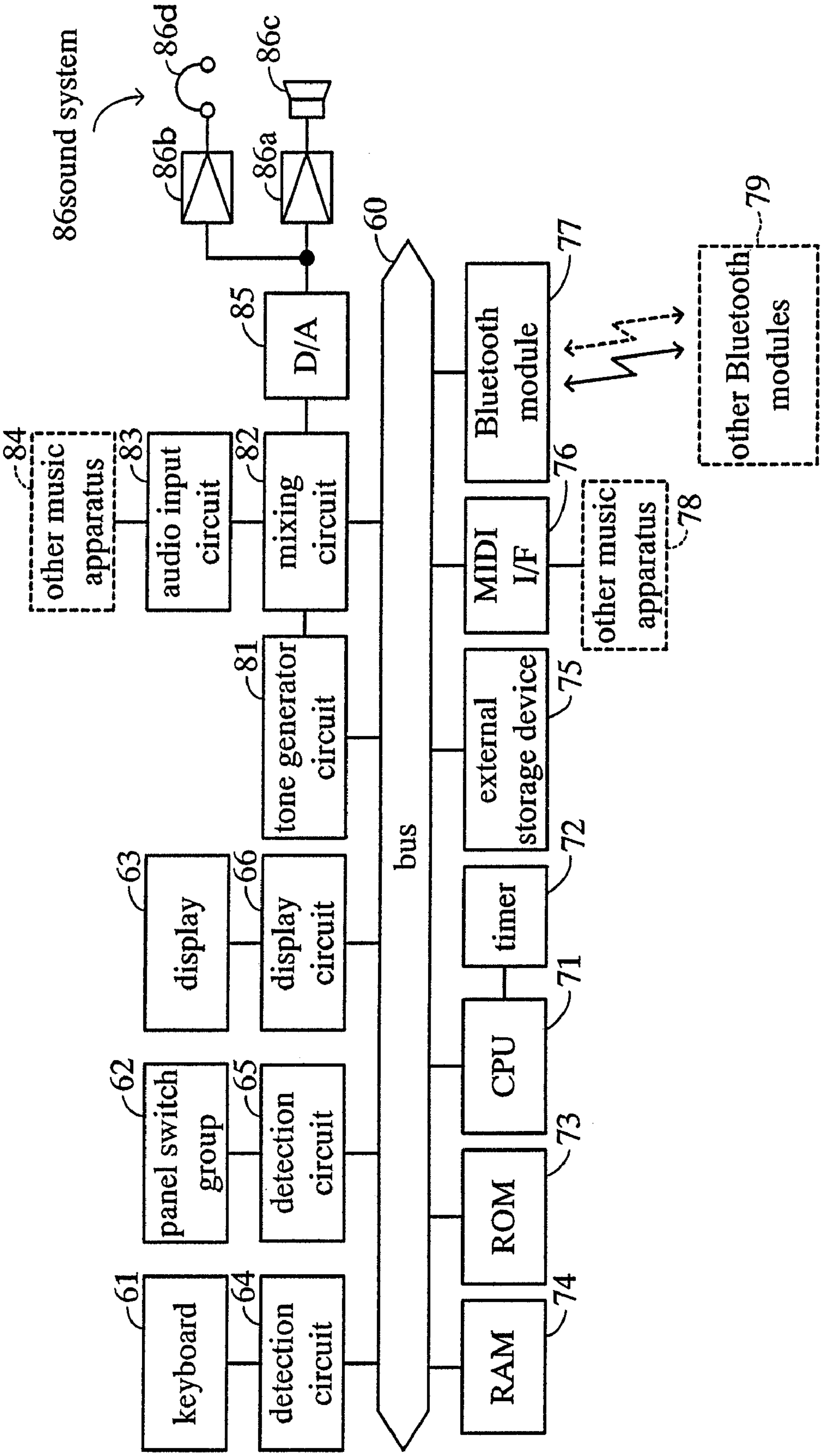
FIG. 3 is a block diagram illustrating an embodiment of a music apparatus (electronic musical instrument) and a mixer apparatus of FIGS. 1 and 2.

Here, the relationship of music apparatus 10, 20 and mixer apparatus 40 in FIG. 2 to the aforesaid music apparatus constructed as shown in FIG. 3 will be described. First, the relationship between music apparatus 10 in FIG. 2 and the music apparatus in FIG. 3 will be described. MIDI data generator 12 in FIG. 2 corresponds to a device for outputting the performance data produced by playing on keyboard 61 and a device for reproducing the performance data in the music data stored in external storage device 75 in FIG. 3. In other words, MIDI data generator 12 in FIG. 2 corresponds to keyboard 61, detection circuit 64, CPU 71, external storage device 75, and others in FIG. 3. Bluetooth module 11, D/A converter 14, and sound system 15 in FIG. 2 correspond to Bluetooth module 77, D/A converter 85, and sound system 86 in FIG. 3, respectively. Decoder 13 in FIG. 2 corresponds to a device for decoding the audio signals received by Bluetooth module 77 by a program process, namely, to CPU 71, RAM 74, and others in FIG. 3. Microcomputer 16 in FIG. 2 corresponds to CPU 71, timer 72, ROM 73, RAM 74, and external storage device 75 in FIG. 3.

The relationship between music apparatus 20 in FIG. 2 and the music apparatus in FIG. 3 will be described. MIDI data generator 12 in FIG. 2 corresponds to a device for outputting the performance data produced by playing on keyboard 61, a device for reproducing the performance data in the music data stored in external storage device 75, a device for inputting MIDI data from outside, and others in FIG. 3, namely, to keyboard 61, detection circuit 64, CPU 71, external storage device 75, MIDI interface circuit 76, Bluetooth module 77, and others in FIG. 3. Tone generator circuit 23 in FIG. 2 corresponds to a device for producing music tone signals in accordance with performance data, MIDI data, or the like, namely, to tone generator circuit 81 in FIG. 3. Regarding Bluetooth module 21, decoder 25, D/A converter 26, sound system 27, and microcomputer 28 in FIG. 2, the same applies as in the case of Bluetooth module 11, decoder 13, D/A converter 14, sound system 15, and microcomputer 16 in FIG. 2 described above.

The relationship between mixer apparatus 40 in FIG. 2 and the music apparatus in FIG. 3 will be described. MIDI data generator 47 in FIG. 2 corresponds to a device for outputting the performance data produced by playing on keyboard 61 and a device for reproducing the performance data in the music data stored in external storage device 75 in FIG. 3, namely, to keyboard 61, detection circuit 64, CPU 71, external storage device 75, and others in FIG. 3. Tone generator circuits 42*a*, 42*b* in FIG. 2 correspond to a device for producing music tone signals in accordance with performance data, MIDI data, or the like, namely, to tone generator circuit 81 in FIG. 3. Decoders 43*a*, 43*b* in FIG. 2 correspond to a device for decoding the audio signals received by Bluetooth module 77 by a program process, namely, to CPU 71, RAM 74, and others in FIG. 3. Encoder 55 in FIG. 2 corresponds to a device for encoding the audio signals to be output to Bluetooth module 77 by a program process, namely, to CPU 71, RAM 74, and others in FIG. 3.

Characteristics control circuits 44*a* to 44*d*, level setting circuits 45*a* to 45*d*, 51, additive synthesis circuits 46*a* to 46*d*, 54*a* to 54*d* correspond to a device for controlling the characteristics of audio signals by a program process, a device for controlling the levels of audio signals by a program process, and a device for performing additive synthesis of audio signals by a program process, namely, to panel switch group 62, detection circuit 65, CPU 71, RAM 74, mixing circuit 82, and others. Bluetooth module 41, D/A converter 52, and sound system 53 in FIG. 2 correspond to Bluetooth module 77, D/A converter 85, and sound system 86 in FIG. 3, respectively. Microcomputer 56 in FIG. 2 corresponds to CPU 71, timer 72, ROM 73, RAM 74, and external storage device 75 in FIG. 3.

Further, although an embodiment of music apparatus (microphone apparatus) 30 in FIG. 2 is not illustrated, sound system 37 in this music apparatus 30 corresponds to sound system 86 such as shown in FIG. 3, and includes a speaker and a headphone. Further, microcomputer 38 in FIG. 2 is constructed with circuits similar to CPU 71, timer 72, ROM 73, RAM 74, and external storage device 75 in FIG. 3.

Figure 4:
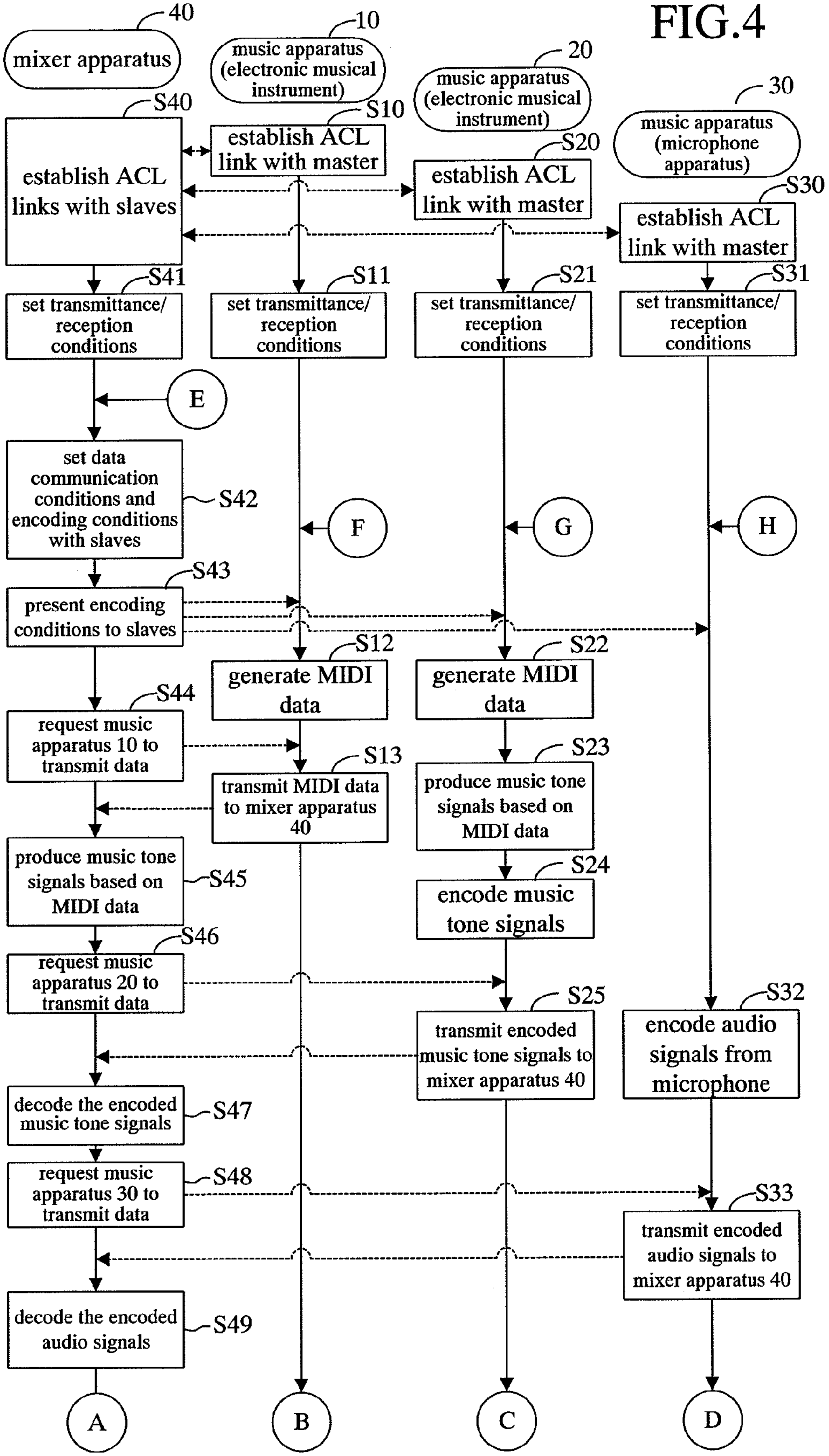
FIG. 4 is a flowchart showing the former part of a program executed by the mixer apparatus and the music apparatus of FIGS. 1 and 2 and related to link setting and data transmission/reception.

Next, the operation of music apparatus 10 to 30 and mixer apparatus 40 constructed as shown above will be described along the flowcharts of FIGS. 4 and 5. In these music apparatus 10 to 30 and mixer apparatus 40, Bluetooth modules 11, 21, 31, 41 of apparatus 10 to 40 are set in advance so that music apparatus 10 to 30 may function as slaves and mixer apparatus 40 may function as a master. When the power switches of apparatus 10 to 40 are turned on in a predetermined area music apparatus 10 to 40 can transmit and receive data with each other, an ACL link is established among Bluetooth modules 11, 21, 31, 41. Alternatively, when apparatus 10 to 40 are moved into a predetermined area in a state in which the power switches of apparatus 10 to 40 are turned on, an ACL link is established among Bluetooth modules 11, 21, 31, 41. In this case, the power switch of mixer apparatus 40 functioning as a master is turned on first, and thereafter the power switches of music apparatus 10 to 30 functioning as slaves are turned on (or the slaves are moved into an area where communication with the master can be made). This is because, if a Bluetooth module functioning as a master is not present, the piconet connection is not established. Thus, microcomputers 16, 28, 38, 56 establish the aforesaid ACL link of Bluetooth modules 11, 21, 31, 41 by the processes of steps S10, S20, S30, S40.

Next, conditions for transmitting and receiving signals between music apparatus 10 to 30 and mixer apparatus 40 are set. In this case, a user operates panel switch group 62 while looking at display 63 of music apparatus 10 to 30 and mixer apparatus 40. Hereafter, the aforesaid setting of the conditions for transmitting and receiving signals will be described by referring to the above-described case of FIG. 2 as an example. In mixer apparatus 40, channels in mixing, input sources, and types of input signals are set as a condition for receiving signals, as shown in the following Table 1, through the process of step S41 performed by microcomputer 56. Further, in the step S41, destinations for outputting the results of mixing shown in the following Table 2 are set as a condition for transmitting signals.

TABLE 1

| Ch | input sources | type of input signals |
|---|---|---|
| 1 | music apparatus 10<br>(electronic musical instrument)<br>(Bluetooth module 11) | MIDI |
| 2 | music apparatus 20<br>(electronic musical instrument)<br>(Bluetooth module 21) | audio |
| 3 | music apparatus 30<br>(microphone)<br>(Bluetooth module 31) | audio<br><br>MIDI |
| 4 | mixer apparatus 40 | |

TABLE 2

| mixing output destinations |
|---|
| music apparatus 10 (electronic musical instrument)<br>(Bluetooth module 11)<br>music apparatus 20 (electronic musical instrument)<br>(Bluetooth module 21)<br>music apparatus 30 (microphone)<br>(Bluetooth module 31) |

In music apparatus 10 to 30, output destinations and types of output signals are set, as shown in the following Table 3, by the processes of steps S11, S21, S31 performed by microcomputers 16, 28, 38 as a condition for transmitting signals. Further, in these processes of steps S11, S21, S31, monitor input sources shown in the following Table 4 are set as a condition for receiving signals.

TABLE 3

| output destinations | types of output signals |
|---|---|
| mixer apparatus 40<br>(Bluetooth module 41) | MIDI |

TABLE 4

| monitor input sources |
|---|
| mixer apparatus 40<br>(Bluetooth module 41) |

After the aforesaid process of step S41, microcomputer 56 in step S42 sets a condition for communicating data in accordance with the number of connected slaves, the types of transmitted and received signals (MIDI/audio signals), and others, and sets a condition for encoding the audio signals to be transmitted and received. Specifically, if the number of connected slaves is large, the quality of the audio signals at the time of encoding may be reduced (if the quality is low, the amount of data per one channel decreases, so that simultaneous transmittance/reception can be made through a larger number of channels), while if the number of slaves is small, the quality at the time of encoding the audio signals may be raised (if simultaneous transmission/reception is made through a smaller number of channels, the amount of data per one channel can be increased, so that the audio signals can be transmitted and received with raised quality of encoding). Alternatively, if MIDI is included as the transmitted and received signals, the quality of the audio signals at the time of encoding may be raised (since the amount of transmitted/received data is small in MIDI, the quality of the audio signals can be raised by allotting the reduced amount to the data transmittance/reception of the audio signals). In any case, the encoding condition is variably set so that the audio data can be transmitted and received with the highest possible quality in accordance with the number of connected slaves and the types of transmitted and received signals.

Then, in step S43, the encoding condition is transmitted to music apparatus 10 to 30 via Bluetooth module 41. In music apparatus 10 to 30, the aforesaid transmitted encoding condition is incorporated into microcomputers 16, 28, 38 via Bluetooth modules 11, 21, 31, whereafter the decoding operations and encoding operations in decoders 13, 25, 35, 43*a*, 43*b* and encoders 24, 34, 55 will be controlled in accordance with the aforesaid encoding condition.

After the setting of various conditions such as described above is finished, when MIDI data are generated in MIDI data generator 12 through the process of step S12 performed by microcomputer 16, Bluetooth module 11 temporarily stores these MIDI data.

Further, in music apparatus 20, when MIDI data are generated in MIDI data generator 22 through the process of step S22 performed by microcomputer 28, digital music tone signals are produced in tone generator circuit 23 on the basis of the aforesaid MIDI data by the process of step S23. These digital music tone signals are encoded in encoder 24 through the process of step S24 and supplied to Bluetooth module 21, which in turn temporarily stores the aforesaid encoded digital music tone signals.

Further, in music apparatus 30, when audio signals such as human voices and tones of musical instruments are input into microphone 32, these audio signals are subjected to A/D conversion in A/D converter 33. These digital audio signals subjected to A/D conversion are then encoded in encoder 34 through the process of step S32 performed by microcomputer 28 and supplied to Bluetooth module 31, which in turn temporarily stores the aforesaid encoded digital music tone signals.

When a request for data transmittance is issued from mixer apparatus 40 to music apparatus 10 through the process of step S44 performed by microcomputer 56 in this state, music apparatus 10 transmits the aforesaid MIDI data temporarily stored in Bluetooth module 11 to mixer apparatus 40 through the process of step S13 performed by microcomputer 16. Mixer apparatus 40 receives these transmitted MIDI data at Bluetooth module 41.

In mixer apparatus 40, the MIDI data received at Bluetooth module 41 are sent to tone generator circuit 42*a* through the process of step S45. Tone generator circuit 42*a* then produces digital music tone signals on the basis of these MIDI data.

Also, when a request for data transmittance is issued from mixer apparatus 40 to music apparatus 20 through the process of step S46 performed by microcomputer 56, music apparatus 20 transmits the aforesaid encoded digital music tone signals temporarily stored in Bluetooth module 21 to mixer apparatus 40 through the process of step S25 performed by microcomputer 28. Mixer apparatus 40 receives these transmitted digital music tone signals at Bluetooth module 41. These music tone signals are then decoded in decoder 43*a* through the process of step S47.

Also, when a request for data transmittance is issued from mixer apparatus 40 to music apparatus 30 through the process of step S48 performed by microcomputer 56, music apparatus 30 transmits the aforesaid encoded digital audio signals temporarily stored in Bluetooth module 31 to mixer apparatus 40 through the process of step S33 performed by microcomputer 38. Mixer apparatus 40 receives these transmitted digital audio signals at Bluetooth module 41. These digital audio signals are then decoded in decoder 43*b* through the process of step S49.

Figure 5:
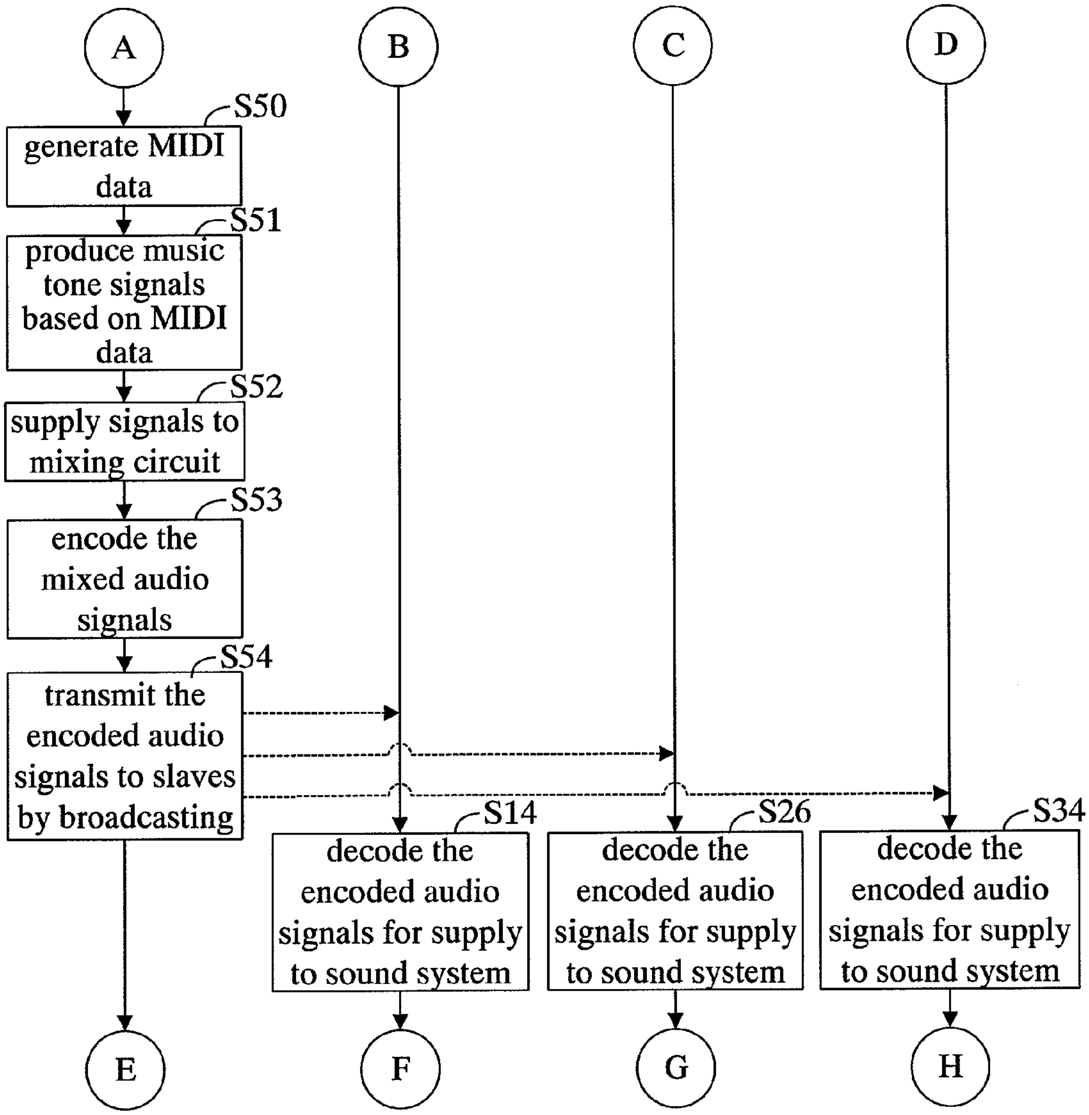
FIG. 5 is a flowchart showing the latter part of the program.

Further, in mixer apparatus 40, when MIDI data are generated in MIDI generator 47 through the process of step S50 of FIG. 5 performed by microcomputer 56, digital music tone signals are produced in tone generator circuit 42*b* on the basis of the aforesaid MIDI data through the process of step S51.

Next, the aforesaid produced and decoded digital music tone signals and digital audio signals are supplied from tone generator circuits 42*a*, 42*b* and decoders 43*a*, 43*b* to characteristics control circuits 44*a* to 44*d* constituting the mixing circuit through the process of step S52. Characteristics control circuits 44*a* to 44*d* independently control the characteristics of the digital music tone signals and digital audio signals from tone generator circuit 42*a*, decoders 43*a*, 43*b*, and tone generator circuit 42*b*, respectively, for output to level setting circuits 45*a* to 45*d*, respectively. Level setting circuits 45*a* to 45*d* independently control the tone volume levels of the digital music tone signals and digital audio signals having controlled characteristics, respectively, for output to additive synthesis circuits 46*a* to 46*d*, respectively.

Additive synthesis circuits 46*a* to 46*d* perform additive synthesis of these digital music tone signals and digital audio signals, and output the synthesized digital audio signal to D/A converter 52 via level setting circuit 51. D/A converter 52 in turn converts this digital audio signal into analog audio signal and supplies the converted analog audio signal to sound system 53. Sound system 53 then generates the aforesaid analog audio signal.

On the other hand, the aforesaid digital music tone signals and digital audio signals from level setting circuits 45*a* to 45*d* are also supplied to additive synthesis circuits 54*a* to 54*d*, respectively, and additive synthesis circuits 54*a* to 54*d* perform additive synthesis of these digital music tone signals and digital audio signals for output.

Then, through the process of step S53 performed by microcomputer 56, the aforesaid digital audio signal obtained by additive synthesis of the digital music tone signals and digital audio signals is encoded in encoder 55 and temporarily stored into Bluetooth module 41. This digital audio signal temporarily stored in Bluetooth module 41 is transmitted from the module 41 to music apparatus 10 to 30 respectively by broadcast communication procedure (multiple address communication procedure) through the process of step S54.

Music apparatus 10 to 30 receive the aforesaid transmitted digital audio signal at Bluetooth modules 11 to 31, respectively. Then, through the processes of steps S14, S26, S34 performed by microcomputers 16, 28, 38, the aforesaid received digital audio signal is decoded in decoders 13, 25, 35, respectively. These decoded digital audio signals are converted into analog audio signals in D/A converters 14, 26, 36, respectively. These analog audio signals are then supplied to sound systems 15, 27, 37 for generating tones.

After the aforesaid processes of steps S14, S26, S34, S54, microcomputers 16, 28, 38, 56 return to steps S12, S22, S32, S42, respectively, and repeatedly execute the aforesaid processes of steps S12, S22, S32, S42 to steps S14, S26, S34, S54, thereby continuously executing the aforesaid operation of mixing the audio signals.

As will be understood from the above description of the operations, according to the above-described embodiment, the audio signals (including the music tone signals) and MIDI data from the plurality of music apparatus 10 to 30 are supplied to mixer apparatus 40 by wireless, thereby eliminating the need for connecting the plurality of music apparatus 10 to 30 to mixer apparatus 40 by means of cables. This saves the labor of wiring and connection of the cables, and the placement (arrangement) of music apparatus 10 to 30 and mixer apparatus 40 can be made freely without being restricted by the cables.

Further, since mixer apparatus 40 inputs the audio signals and MIDI data from the plurality of music apparatus 10 to 30, traffic (transfer of information) can be controlled efficiently by allowing mixer apparatus 40 to function as a master and allowing the plurality of music apparatus 10 to 30 to function as slaves. Specifically, in piconet connection of Bluetooth, transmittance and reception of data are always carried out through communication between a master and slaves. For this reason, supposing that data are to be transmitted from one slave to a different slave, one must once transmit the data from the one slave to the master and thereafter transmit the data from the master to the different slave. Supposing that the one slave is a music apparatus and the different slave is mixer apparatus 40, the data transmitted from music apparatus 10 to 30 are once received by the master and thereafter transmitted from the master to mixer apparatus 40. If this is carried out, one piece of data must be sent twice, thereby increasing the communication traffic and increasing the time delay till the piece of data reaches the destination. However, if mixer apparatus 40 is the master, data can be transmitted from music apparatus 10 to 30 functioning as slaves to mixer apparatus 40 by one data transmittance process, thereby preventing the increase of communication traffic and the increase of time delay.

Moreover, since mixer apparatus 40 is constructed to receive audio signals and MIDI data from the plurality of music apparatus 10 to 30 by isochronous communication procedure, the audio signals and MIDI data can be transmitted at a comparatively high transfer rate, thereby achieving a communication with comparatively smaller delays. Specifically, in the piconet connection of Bluetooth, there are an SCO link and an ACL link, as described before. The SCO link is a communication link with three channels at the maximum which is suitable for real-time voice communication with a predetermined communication speed (64 kbps) ensured. On the other hand, the ACL link is a communication link which is originally unsuitable for voice communication with varying communication speed depending on data traffic and others. At first sight, the SCO link may seem suitable for mixer apparatus 40; however, the ACL link can have seven channels at the maximum with a high maximum communication speed (for example, 432.6 kbps at the maximum), and can transmit audio data of high tone quality. Moreover, in the ACL link, there are the asynchronous communication procedure, the isochronous communication procedure, and the broadcast communication procedure, and among these, the isochronous communication procedure is a procedure with comparatively smaller time delays. Therefore, in this embodiment, mixer apparatus 40 having a comparatively high competence has been realized by adopting the isochronous communication procedure of the ACL link with comparatively smaller time delays at this communication speed. Here, if a high competence is not desired, mixer apparatus 40 with three channels at the maximum may be realized by adopting the SCO link.

Further, since music apparatus 10 to 30 receive and reproduce the audio signals mixed in mixer apparatus 40, the results of mixing a plurality of audio signals can be monitored at the position of each music apparatus 10 to 30. Since the transmittance of audio signals in this case is carried out by the broadcast communication procedure (multiple address communication procedure), the traffic can be controlled efficiently without increasing the amount of traffic. Specifically, with the broadcast communication procedure, the slave side that has received data need not send a response notifying the receipt of data to the master, and moreover, the same data can be transmitted to a plurality of slaves at a time, thereby enhancing the traffic efficiency. Here, since the slaves do not send the response notifying the receipt of data to the master, there will be no assurance of data reaching the destination with certainty; however, the loss of a small amount of data will not be a problem as long as the data are used for confirming the results of mixing. In this case, a filter for smoothing the data may be used in order to prevent noise generation caused by the loss of data.

Further, the communication condition such as described above between mixer apparatus 40 and music apparatus 10 to 30 is set through the processes of steps S10, S11, S20, S21, S30, S31, S40, S41. Therefore, even if the combination of mixer apparatus 40 with plural music apparatus 10 to 30 is changed, one can meet the change speedily.

Furthermore, although not specifically described in the above description of operations using the functional block diagram of FIG. 2, mixer apparatus 40 can receive input of audio signals also by wire from another music apparatus 84 into audio input circuit 83, as shown in FIG. 3, and these audio signals can be mixed as well. Further, mixer apparatus 40 can receive input of MIDI data also by wire from another music apparatus 78, as shown in FIG. 3, and the audio signals produced in tone generator circuit 81 on the basis of these MIDI data can be mixed as well. Therefore, audio signals and audio signals based on MIDI data from other music apparatus without having wireless communication means can be mixed as well in mixer apparatus 40, whereby more audio signals can be mixed, and a more opulent music can be realized.

Here, in the above-described embodiment, three music apparatus 10 to 30 are connected to mixer apparatus 40; however, the number of music apparatus connected to mixer apparatus 40 is not limited to three but may be a different number. Specifically, if a Bluetooth module is to be adopted as wireless communication means as in the above-described embodiment, seven music apparatus can be connected by wireless as slaves to mixer apparatus 40, since the current piconet of Bluetooth Ver. 1.0 can have seven slaves at the maximum. However, if the number of slaves increases, the data transfer rate between mixer apparatus 40 and each slave decreases, whereby the tone quality decreases. Therefore, it is preferable that about three or four music apparatus are connected to mixer apparatus 40. However, if the data transfer rate increases owing to a future advancement of Bluetooth technology, mixing at a high tone quality can be achieved even if the number of music apparatus connected to mixer apparatus 40 increases.

Further, an electronic musical instrument and a microphone apparatus are adopted as music apparatus 10 to 30; however, any apparatus may be adopted as a music apparatus as long as the music apparatus can transmit audio signals or audio signal producing signals, and the combination thereof can be freely made.

Further, in the above-described embodiment, description has been made only for the case in which two tone generator circuits 42*a*, 42*b* and two decoders 43*a*, 43*b* are used in mixer apparatus 40; however, the number of tone generator circuits and the number of decoders can be freely set. In addition, the number of MIDI data generators 47 for generating MIDI data independently from music apparatus 10 to 30 may be increased.

Further, in the above-described embodiment, mixer apparatus 40 having an electronic musical instrument function, namely mixer apparatus 40 incorporating tone generator circuits 42*a*, 42*b* that generate music tone signals, is adopted; however, a mixer apparatus that does not include an electronic musical instrument function and receives only the audio signals for mixing can be adopted as mixer apparatus 40.

Further, when a music apparatus functioning as a new slave enters the communication range of the piconet while mixer apparatus 40 is receiving MIDI data and audio signals from music apparatus 10 to 30 such as an electronic musical instrument and a microphone apparatus and mixing the audio signals, this new music apparatus may be added into the piconet so that the new music apparatus may participate in the aforesaid mixing of audio signals. At this moment, if the new apparatus is an apparatus functioning as one of the slaves previously set in mixer apparatus 40, the new apparatus may be added into the piconet, while in the other cases, the new music apparatus may not be added into the piconet. Further, when one or more music apparatus (slaves) have gone out of the communication range of the piconet while the audio signals are being mixed, or when the power switch of the music apparatus is turned off, the music apparatus may be excluded from the piconet.

Further, a buffer for accumulating audio data corresponding to a predetermined period of time may be provided (for example, the buffer may be disposed at the stage previous to each characteristics control circuit 44) in order to absorb the data transmittance/reception time delays of each channel so that the data of each channel may be output in synchronization. This allows that, even if data transmittance time delays are present, sounds are not interrupted, although time delays may occur to some extent.

Further, in the above-described embodiment, electronic musical instruments having a keyboard are adopted as music apparatus 10, 20; however, electronic musical instruments having performance operators other than a keyboard, for example, electronic musical instruments of string instrument type, wind instrument type, percussion instrument type, and the like can be adopted as well.

Furthermore, in carrying out the present invention, it is not limited to the above-described embodiments or modifications thereof, so that various modifications can be made as long as they do not depart from the object of the present invention.

What is claimed is:

1. A mixer apparatus for inputting audio signals or audio signal producing signals respectively produced in a plurality of music apparatuses and for mixing the input audio signals or audio signals produced on the basis of the input audio signal producing signals, said mixer apparatus comprising:

a wireless communication section capable of wireless communication with said plurality of music apparatuses by allowing said plurality of music apparatuses to function as slaves and allowing said mixer apparatus itself to function as a master, said wireless communication section respectively receiving said audio signals or audio signal producing signals that are transmitted from said plurality of music apparatuses;

a wired input section connected by wire to a different music apparatus other than said plurality of music apparatuses, for wired input of audio signals or audio signal producing signals for producing audio signals that are output from the different music apparatus; and a mixing section for mixing the audio signals received by said wireless communication section or the audio signals produced on the basis of the audio signal producing signals received by said wireless communication section with the audio signals input by said wired input section or the audio signals produced on the basis of the audio signal producing signals input by said wired input section, wherein said wireless communication section respectively issues requests to said plurality of music apparatuses for transmittance of said audio signals or audio signal producing signals, and respectively receives said audio signals or audio signal producing signals that are transmitted from said plurality of music apparatuses in response to said requests for transmittance.

2. The mixer apparatus according to claim 1, wherein said wireless communication section receives said audio signals or audio signal producing signals from said plurality of music apparatuses by an isochronous communication procedure.

3. The mixer apparatus according to claim 1, wherein said wireless communication section transmits the audio signals mixed in said mixing section to said plurality of music apparatuses.

4. The mixer apparatus according to claim 3, wherein said wireless communication section transmits the audio signals mixed in said mixing section to said plurality of music apparatuses by a broadcast communication procedure.

5. The mixer apparatus according to claim 1, further comprising a communication condition setting section for setting conditions of communication with said plurality of music apparatuses in a state in which a wireless connection is established between said mixer apparatus and said plurality of music apparatuses.

6. The mixer apparatus according to claim 1, further comprising an audio signal generating section for generating audio signals independently from said plurality of music apparatuses, wherein said mixing section also mixes the audio signals generated by said audio signal generating section, in addition to the audio signals received by said wireless communication section or the audio signals produced on the basis of the audio signal producing signals received by said wireless communication section.

7. A mixer apparatus comprising:

a wireless communication section for:

receiving by wireless audio signals or audio signal producing signals from a plurality of first music apparatuses; and receiving by wireless other audio signals or other audio signal producing signals from a second music apparatus, and a mixing section for mixing the received audio signals or audio signals produced on the basis of the received audio signal producing signals from the plurality of first music apparatuses, wherein said mixing section is configured to, upon entry of the second music apparatus within communication range of the mixer apparatus while the mixing section is performing said mixing of the received audio signals or the audio signals produced on the basis of the received audio signal producing signals, initiate mixing of the received other audio signals or other audio signals produced on the basis of the other audio signal producing signals with the received audio signals or the audio signals produced on the basis of the received audio signal producing signals from the plurality of first apparatuses.

8. A computer readable storage medium storing a computer-executable program for execution at a mixer apparatus, the mixer apparatus communicating with a plurality of music apparatuses wirelessly and connecting a different music apparatus other than said plurality of music apparatuses by wire, said computer-executable program that, when executed by a computer, causes the mixer apparatus to perform the steps of:

causing the plurality of music apparatuses to function as slaves and the mixer apparatus to function as a master;

issuing requests to the plurality of music apparatuses for transmittance of audio signals or audio signal producing signals;

receiving audio signals or audio signal producing signals for producing audio signals that are transmitted wirelessly from the plurality of music apparatuses in response to said requests for transmittance;

inputting audio signals or audio signal producing signals for producing audio signals from the different music apparatus; and mixing the audio signals received by said receiving step or the audio signals produced on the basis of the audio signal producing signals received by said receiving step with the audio signals input by the inputting step or the audio signals produced on the basis of the audio signal producing signals input by the inputting step.

* * * * *